(12) United States Patent
Suzuki et al.

(10) Patent No.: US 8,445,160 B2
(45) Date of Patent: May 21, 2013

(54) FUEL CELL WITH GAS PASSAGE FORMING MEMBER AND WATER INGRESSION PREVENTING MEANS

(75) Inventors: Yukihiro Suzuki, Kariya (JP); Keiji Hashimoto, Kariya (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 337 days.

(21) Appl. No.: 12/811,513

(22) PCT Filed: May 13, 2009

(86) PCT No.: PCT/JP2009/058914
§ 371 (c)(1),
(2), (4) Date: Jul. 1, 2010

(87) PCT Pub. No.: WO2010/013524
PCT Pub. Date: Feb. 4, 2010

(65) Prior Publication Data
US 2010/0291472 A1 Nov. 18, 2010

(30) Foreign Application Priority Data

Jul. 30, 2008 (JP) ................................. 2008-196835

(51) Int. Cl.
*H01M 2/14* (2006.01)
(52) U.S. Cl.
USPC ........................... 429/516; 429/512; 429/514
(58) Field of Classification Search
USPC .......................................... 429/512, 514, 516
See application file for complete search history.

(56) References Cited

U.S. PATENT DOCUMENTS

| 6,368,740 B1 * | 4/2002 | Dristy ........................... 429/469 |
| 2001/0049044 A1 * | 12/2001 | Molter ............................ 429/34 |
| 2009/0155665 A1 | 6/2009 | Hashimoto |

FOREIGN PATENT DOCUMENTS

| JP | 2002-533578 | 10/2002 |
| JP | 2007-018958 | 1/2007 |
| JP | 2007-087768 | 4/2007 |
| JP | 2007-250353 | 9/2007 |
| JP | 2008-277178 | 11/2008 |
| WO | WO 00/39364 | 7/2000 |

* cited by examiner

*Primary Examiner* — Zachary Best
(74) *Attorney, Agent, or Firm* — Patterson Thuente Christensen Pedersen, P.A.

(57) ABSTRACT

An electrolyte membrane on the inside of annular frames with an anode-side electrode catalyst layer, a first gas diffusion layer and a first gas flow channel-forming body stacked on top of the membrane. An electrode catalyst layer, a second gas diffusion layer and a second gas flow channel-forming body are stacked on the underside. Frames have a supply channel supplying fuel gas to the gas flow channel in the first gas flow channel-forming body, a discharge channel discharges the fuel gas. An overhang part that extends outward is on the outer peripheral edge of the first channel-forming body to overlap a flange part of the frame beyond the outer peripheral edge of the anode-side electrode catalyst layer. Penetration of seeping water can be prevented by retaining the seeping water in the overhang part.

5 Claims, 7 Drawing Sheets

PRIOR ART

FUEL CELL WITH GAS PASSAGE FORMING MEMBER AND WATER INGRESSION PREVENTING MEANS

PRIORITY CLAIM

The present application is a National Phase entry of PCT Application No. PCT/JP2009/058914, filed May 13, 2009, which claims priority from Japanese Patent Application Number 2008-196835, filed Jul. 30, 2008, the disclosures of which are hereby incorporated by reference herein in their entirety.

FIELD OF THE INVENTION

The present invention relates to a power generating cell for a fuel battery that is mounted, for example, on an electric car.

BACKGROUND OF THE INVENTION

Typically, a fuel battery has a cell stack formed by a number of power generating cells stacked together. With reference to FIGS. 9 to 12, a prior art power generating cell will be described. As shown in FIG. 9, a pair of upper and lower frames 13, 14 are connected to each other, and an electrode structure 15 is installed at the joint portion of the frames 13, 14. The electrode structure 15 is formed by a solid electrolyte membrane 16, an electrode catalyst layer 17 on the anode side, and an electrode catalyst layer 18 on the cathode side. The outer periphery of the solid electrolyte membrane 16 is held between the frames 13, 14. The anode-side electrode catalyst layer 17 is laid on the upper surface of the solid electrolyte membrane 16, and the cathode-side electrode catalyst layer 18 is laid on the lower surface of the solid electrolyte membrane 16. A first gas diffusion layer 19 is laid on the upper surface of the electrode catalyst layer 17, and a second gas diffusion layer 20 is laid on the lower surface of the electrode catalyst layer 18. Further, a first gas passage forming member 21 is laid on the upper surface of the first gas diffusion layer 19, and a second gas passage forming member 22 is laid on the lower surface of the second gas diffusion layer 20. A flat plate-like separator 23 is joined to the upper surface of the first gas passage forming member 21, and a flat plate-like separator 24 is joined to the lower surface of the second gas passage forming member 22.

The solid electrolyte membrane 16 is formed of a fluoropolymer film. As shown in FIG. 10, the electrode catalyst layer 17, 18 each have carbon particles 31 of diameters of several micrometers, and a great number of platinum (Pt) catalyst particles 32 adhere to the surface of each carbon particle 31. The catalyst particles 32 have a diameter of 2 nm. When electricity is generated by the fuel battery, the catalyst particles 32 function as catalyst that increases the power generation efficiency. The gas diffusion layers 19, 20 are formed of carbon paper.

FIG. 11 is an enlarged perspective view showing a part of the first and second gas passage forming members 21, 22. As shown in FIG. 11, the gas passage forming member 21 (22) is made of a metal lath plate, which has a great number of hexagonal ring portions 21a (22a) arranged alternately. Each ring portion 21a (22a) has a through hole 21b (22b). Fuel gas (oxidation gas) flows through gas passages formed by the ring portions 21a (22a) and the through holes 21b (22b).

As shown in FIG. 9, the frames 13, 14 form a supply passage M1 and a discharge passage M2 for fuel gas. The fuel gas supply passage M1 is used for supplying hydrogen gas, which serves as fuel gas, to the gas passages of the first gas passage forming member 21. The fuel gas discharge passage M2 is used for discharging fuel gas that has passed through the gas passages of the first gas passage forming member 21, or fuel off-gas, to the outside. Also, the frames 13, 14 form a supply passage and a discharge passage for oxidation gas. The oxidation gas supply passage is located at a position corresponding to the back side of the sheet of FIG. 9, and is used for supplying air serving as oxidation gas to the gas passages of the second gas passage forming member 22. The oxidation gas discharge passage is located at a position corresponding to the front side of the sheet of FIG. 9, and is used for discharging oxidation gas that has passed through the gas passages of the second gas passage forming member 22, or oxidation off-gas, to the outside.

Hydrogen gas from a hydrogen gas supply source (not shown) is supplied to the first gas passage forming member 21 through the supply passage M1 as shown by arrow P of FIG. 9, and air is supplied to the second gas passage forming member 22 from an air supply source (not shown). Accordingly, electricity is generated through an electrochemical reaction in the power generating cell. Specifically, hydrogen gas ($H_2$) supplied to the first gas passage forming member 21 flows into the electrode catalyst layer 17 through the first gas diffusion layer 19. In the electrode catalyst layer 17, hydrogen ($H_2$) is broken down to hydrogen ions ($H^+$) and electrons ($e^-$) as shown by chemical formula (1), and the potential of the electrode catalyst layer 17 becomes zero volts, or standard electrode potential, as known in the art.

$$H_2 \rightarrow 2H^+ + 2e^- \qquad (1)$$

Hydrogen ions ($H^+$) obtained through the above reaction reaches the cathode-side electrode catalyst layer 18 from the anode-side electrode catalyst layer 17 through the solid electrolyte membrane 16. Oxygen ($O_2$) in the air supplied to the electrode catalyst layer 18 from the second gas passage forming member 22 chemically reacts with the hydrogen ions ($H^+$) and the electrons ($e^-$), which generates water as shown by the formula (2). Through the chemical reaction, the potential of the electrode catalyst layer 18 becomes approximately 1.0 volt, or standard electrode potential, as known in the art.

$$\tfrac{1}{2}.O^2 + 2H^+ + 2e^- \rightarrow H_2O \qquad (2)$$

In a normal power generation condition of the fuel battery, the potential of the anode-side electrode catalyst layer 17 (the first gas diffusion layer 19) is lower than the potential of the cathode-side electrode catalyst layer 18 (the second gas diffusion layer 20). Thus, compared to the second gas passage forming member 22, the first gas passage forming member 21 is less susceptible to metallic oxidation due to a high potential. Therefore, as shown in FIG. 12, an inexpensive stainless steel such as ferrite-based SUS having a low corrosion resistance. On the other hand, the second gas passage forming member 22, the potential of which can become high, is formed by a metal having a high corrosion resistance such as gold as shown in FIG. 12. Patent Document 1 discloses a power generating cell for a fuel battery having a similar structure to the structure shown in FIG. 9.

Patent Document 1: Japanese Laid-Open Patent Publication No. 2007-87768

DISCLOSURE OF THE INVENTION

Problems that the Invention is to Solve

In the above described fuel battery, some of the hydrogen gas is not used in power generation and is discharged as fuel off-gas to the outside through the gas passage of the first gas passage forming member 21 and the discharge passage M2. Some of the oxygen gas that has not been reduced during the power generation is discharged as oxidation off-gas to the outside through the discharge passage (not shown) formed in the frames 13, 14, together with water generated through the reaction of the formula (2) and nitrogen gas in air. Some of the water generated through the reaction of the formula (2) flows into the gas passage of the first gas passage forming member 21, while seeping as seepage water through the cathode-side electrode catalyst layer 18, the solid electrolyte membrane 16, the anode-side electrode catalyst layer 17, and the first gas diffusion layer 19. The seepage water is discharged to the outside through the gas passage of the first gas passage forming member 21 and the discharge passage M2, together with the fuel off-gas.

As described above with reference to FIG. 11, the first gas passage forming member 21 is made of a metal lath plate, which has a great number of hexagonal ring portions 21a arranged alternately. Fuel gas flows through gas passage formed by the ring portions 21a and the through holes 21b. In this configuration, the seepage water is likely to adhere to the wall surfaces of the gas passage, which meanders in an complex manner, due to surface tension. Therefore, some of the seepage water from the gas passage of the first gas passage forming member 21 is not discharged to the outside but remains in the gas passage as droplets. The seepage water remaining in the gas passage causes the following problems.

That is, the flow rate of fuel gas flowing through the gas passage in the first gas passage forming member 21 becomes higher toward the center as shown by flow rate distribution curve L of FIG. 11, and becomes lower toward the left and right edges. Thus, seepage water tends to remain at the left and right edges of the first gas passage forming member 21. Also, since the downstream edge of the first gas passage forming member 21 is open to the discharge passage M2, the flow resistance at the downstream edge is lower than the flow resistance of the gas passage inside the first gas passage forming member 21. In this configuration, when fuel gas starts flowing to the discharge passage M2 through a part of the downstream edge of the first gas passage forming member 21, the flow resistance at the part is smaller than that of the remaining parts. Thus, the fuel gas flows to the discharge passage M2 through the part of the downstream edge, and the flow in the remaining parts becomes stagnant. Accordingly, in addition to the left and right edges of the first gas passage forming member 21, the flow rate of fuel gas is low at the downstream edge, and seepage water is likely to remain. Since the flow rate of fuel gas in the gas passage of the first gas passage forming member 21 increases toward the center, fuel gas flows to the discharge passage M2 mainly through the center portion at the downstream edge of the first gas flow passage forming member 21, and seepage water tends to remain at the left and right edges.

If seepage water remains in the gas passage in the outer peripheral portion of the first gas passage forming member 21 and forms a droplet W as shown in FIG. 10, fuel gas is blocked by the droplet W. That is, the fuel gas is not provided to portions of the first gas diffusion layer 19 and the electrode catalyst layer 17 that correspond to the droplet W. This can cause a local hydrogen deficiency. Further, seepage water can enter the narrow clearance at the outer periphery of the first gas diffusion layer 19 and the narrow clearance at the outer peripheral portion of the electrode catalyst layer 17. This further worsens the hydrogen deficiency.

As is commonly known, some of the hydrogen in the first gas diffusion layer 19 enters the second gas diffusion layer 20 after seeping through the electrode catalyst layer 17, the solid electrolyte membrane 16, and the electrode catalyst layer 18. Some of the oxygen in the second gas diffusion layer 20 enters the first gas diffusion layer 19 after seeping through the electrode catalyst layer 18, the solid electrolyte membrane 16, and the electrode catalyst layer 17. That is, although the amount is small, cross leakage of hydrogen and oxygen occurs between the first gas diffusion layer 19 and the second gas diffusion layer 20. In a part of the electrode catalyst layer 17 that is deficient in hydrogen, hydrogen for reducing oxygen ($O_2$) does not exist. Thus, if such cross leakage of hydrogen and oxygen occurs, the following phenomenon will be observed.

That is, oxygen ($O^2$) that has entered the anode-side electrode catalyst layer 17 is reduced by hydrated protons (hydrogen ions with water molecules $H^+ \cdot xH_2O$) that exist in the fluoropolymer film forming the solid electrolyte membrane 16. That is, the hydrated protons react with oxygen and electrons to generate water as shown by the formula (3) below. The hydrated protons are charge carriers of the polymer film forming the solid electrolyte membrane 16, and move among sulfonate groups ($-SO_3^-$). The hydrated protons then move from the solid electrolyte membrane 16 to the electrode catalyst layer 17.

$$\tfrac{1}{2} x O^2 + 2H^+ + 2e^- \rightarrow H_2O \quad (3)$$

As a result, although the potential of the anode-side electrode catalyst layer 17 and the first gas diffusion layer 19 is 0 volts as described above, the standard electrode potential of the layers 17, 19, which are deficient in hydrogen due to the reaction of the formula (3), increases to approximately 1.0 volt. The increase of the standard electrode potential of the layers 17, 19 corrodes and oxidizes the first gas passage forming member 21, which is formed of ferrite-based SUS having a low corrosion resistance, thus reducing the durability. When the first gas passage forming member 21 is corroded and oxidized, its electric resistance is increased. This in turn lowers the power generation output.

On the other hand, in the cathode-side electrode catalyst layer 18, the hydrated protons (hydrogen ions $H^+ \cdot xH_2O$) that form the solid electrolyte membrane 16 decrease. To compensate for the reduction in the hydrated protons, carbon (C) forming the electrode catalyst layer 18 and water are reacted as shown by the formula (4), so that carbon dioxide and hydrogen ions ($H^+$) are generated.

$$C + 2H_2O \rightarrow CO_2 + 4H^+ + 4e^- \quad (4)$$

Through this reaction, carbon particles in the cathode-side electrode catalyst layer 18 are reduced, and the electrode catalyst layer 18 becomes prematurely thin, which reduces the durability of the battery. Further, when the carbon particles of the electrode catalyst layer 18 are eroded, the power generation output is lowered. That is, catalyst particles 32 are adhered onto the surface of each carbon particle 31 in order to improve the power generation efficiency at the power generation based on the above described formulae (1) and (2). When the carbon particles 31 are eroded, the catalyst particles 32 are drained to the gas passage of the second gas passage forming member 22 from the electrode catalyst layer 18 through the second gas diffusion layer 20. When the amount of catalyst (platinum) of the electrode catalyst layer 18 is reduced, the catalyst performance of the electrode catalyst layer 18 is lowered. This lowers the power generation efficiency, resulting in the power generation output.

The total of the decrease in the power generation output due to reduction in the catalyst (platinum) of the cathode-side electrode catalyst layer 18 and the decrease in the above described power generation output due to corrosion of the first gas passage forming member 21 was measured in a output test, under a condition that was equivalent to ten years of use. The test revealed that ten years of use reduced the power generation output to 40% compared to 100% of the output at the time when the operation was started.

If a material such as titanium, which has a superior corrosion resistance, or a material obtained by applying gold plating on a ferrite-based SUS, the first gas passage forming member 21 can be prevented from being corroded and its durability is improved. However, this inevitably increases the costs.

Accordingly, it is an objective of the present invention to provide a power generating cell for a fuel battery that, if seepage water remains in the gas passage at the outer peripheral portion of an anode-side gas passage forming member, prevents a cathode-side electrode catalyst layer from being eroded, improves the durability of the anode-side gas passage forming member, and prevents the power generation output from being reduced.

Means for Solving the Problems

To achieve the forgoing objective and in accordance with one aspect of the present invention, a power generating cell for a fuel battery is provided that includes a looped frame, an electrolyte membrane attached inside the frame, an anode-side electrode catalyst layer laid on a first surface of the electrolyte membrane, a cathode-side electrode catalyst layer laid on a second surface of the electrolyte membrane, a first gas passage forming member that is laid on the surface of the anode-side electrode catalyst layer and has a first gas passage for supplying fuel gas, and a second gas passage forming member that is laid on the surface of the cathode-side electrode catalyst layer and has a second gas passage for supplying oxidation gas. A supply passage for supplying fuel gas to the first gas passage and a discharge passage for discharging fuel off-gas from the first gas passage are formed in the frame. Water ingression preventing means that prevents water remaining in a part of the first gas passage at an outer peripheral portion of the first gas passage forming member from entering the anode-side electrode catalyst layer.

Also, according to the present invention, it is preferable that the frame surround the outer periphery of the anode side electrode catalyst layer, that the water ingression preventing means include a projecting portion that is formed on the outer peripheral portion of the first gas passage forming member and extends outward beyond the outer periphery of the anode-side electrode catalyst layer so as to overlap with the frame, and that the water ingression preventing means prevent water from entering the anode-side electrode catalyst layer by causing the water to remain on the projecting portion.

Also, it is preferable that a distance by which the projecting portion extends beyond the outer periphery of the anode-side electrode catalyst layer be set to 5 to 10 mm.

According to the present invention, it is also preferable that the frame be rectangular, and that the projecting portion be one of a plurality of projecting portions that are formed at left, right and downstream edges in the outer peripheral portion of the first gas passage forming member with respect to a flowing direction of the first gas passage.

Further, it is preferable that the water ingression preventing means include a band plate-like shield plate that is located at an inner periphery of the frame and between the electrolyte membrane and the outer peripheral portion of the first gas passage forming member.

It is also preferable that the first gas passage forming member be made of a metal lath.

It is also preferable that the a gas diffusion layer be provided between the anode-side electrode catalyst layer and the first gas passage forming member and between the cathode side electrode catalyst layer and the second gas passage forming member.

(Operation)

According to the present invention, the water ingress preventing means prevents water remaining in the gas passage at the outer peripheral portion of the first gas passage forming member on the anode side from entering the outer peripheral portion of the anode-side electrode catalyst layer, so that hydrogen deficiency is inhibited in the outer peripheral portion of the electrode catalyst layer. Therefore, this prevents the potential of the anode-side electrode catalyst layer from being increased by the hydrogen deficiency, and also inhibits corrosion of the gas passage forming member, thereby inhibiting erosion of the cathode-side electrode catalyst layer.

Effects of the Invention

According to the present invention, in a state where seepage water remains in the gas passage at the outer peripheral portion of the anode-side gas passage forming member, it is possible to improve the durability of the anode-side gas passage forming member, prevent the cathode-side electrode catalyst layer from being eroded, and prevent the power generation output from being reduced.

DETAILED DESCRIPTION OF THE INVENTION

First Embodiment

A power generating cell for a fuel battery according to a first embodiment of the present invention will now be described with reference to FIGS. 1 to 5.

Figure 1:
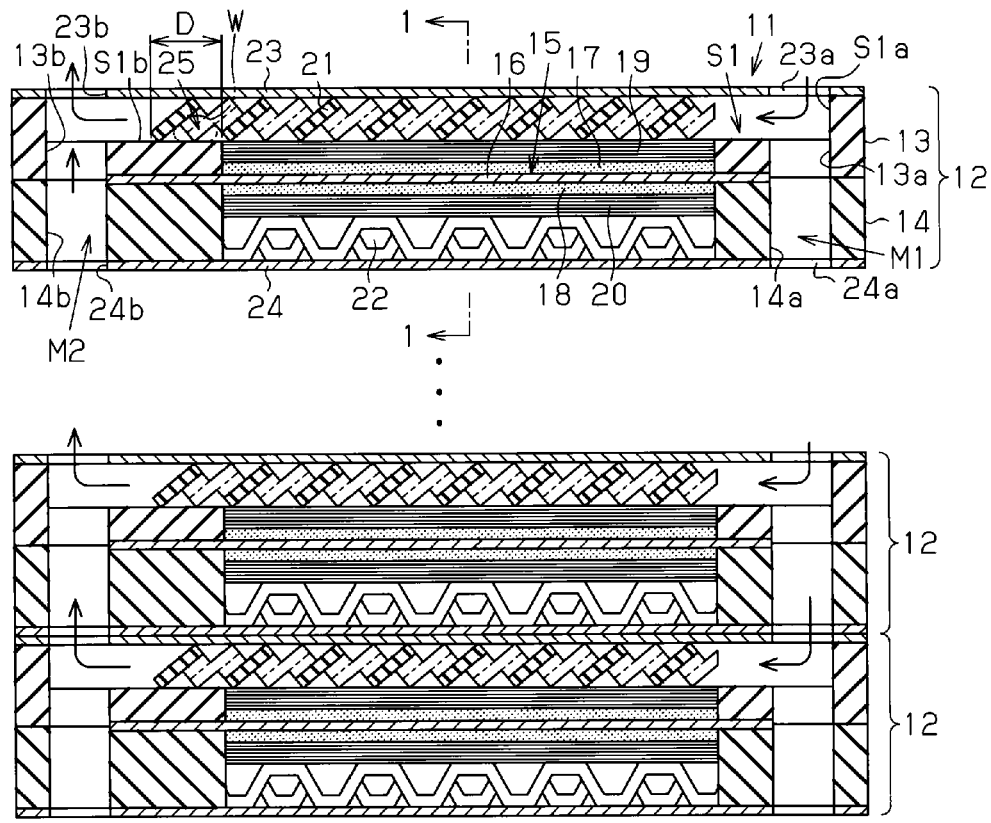
FIG. 1 is a longitudinal cross-sectional view illustrating a fuel battery according to a first embodiment of the present invention.

As shown in FIG. 1, a fuel battery 11 of the present embodiment is a solid polymer type, and is formed by a number of staked power generating cells 12.

Figure 3:
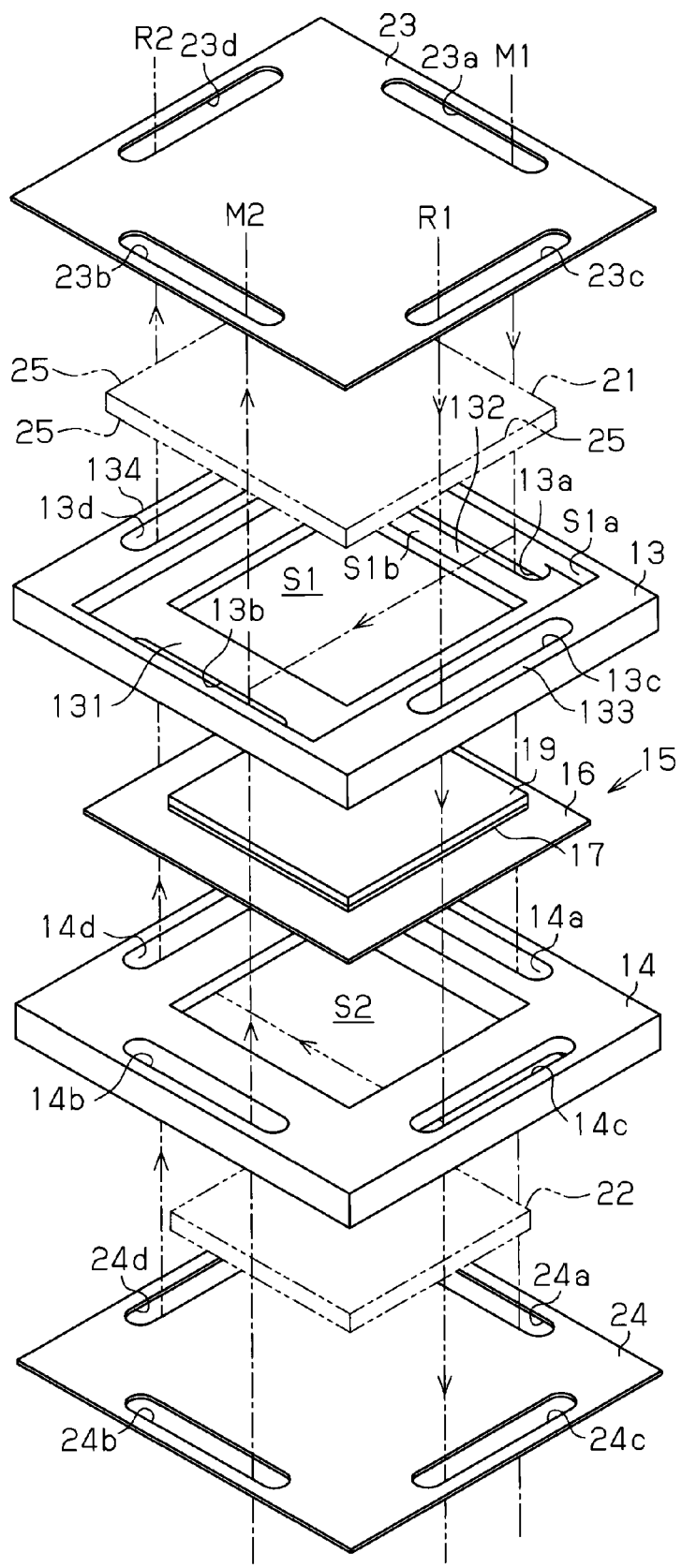
FIG. 3 is an exploded perspective view illustrated first and second frames, an electrode structure, first and second flow passage forming members, and a separator.

As shown in FIGS. 1 and 3, each power generating cell 12 is shaped like a rectangular frame and includes first and second frames 13, 14 made of synthetic rubber (or synthetic resin) and a membrane electrode assembly (MEA) 15, which serves as an electrode structure. The first frame 13 defines in it a passage space S1 for fuel gas, and the second frame 14 defines in it a passage space S2 for oxidation gas. The MEA 15 is arranged between the frames 13, 14.

The power generating cell 12 has a first gas passage forming member 21, which is formed by ferrite-based SUS (stainless steel) accommodated in the fuel gas passage space S1, and a second gas passage forming member 22, which is accommodated in the oxidation gas passage space S2 and is made of titanium or gold. Further, the power generating cell 12 has a first separator 23 and a second separator 24, which are made of titanium. The first separator 23 is shaped like a flat plate, and is bonded to the upper surfaces of the first frame 13 and the first gas passage forming member 21 as viewed in the drawing. The first separator 24 is shaped like a flat plate, and is bonded to the upper surfaces of the first frame 14 and the first gas passage forming member 22 as viewed in the drawing. In FIG. 3, the gas passage forming members 21, 22 are illustrated as flat plates in a simplified manner.

Figure 2:
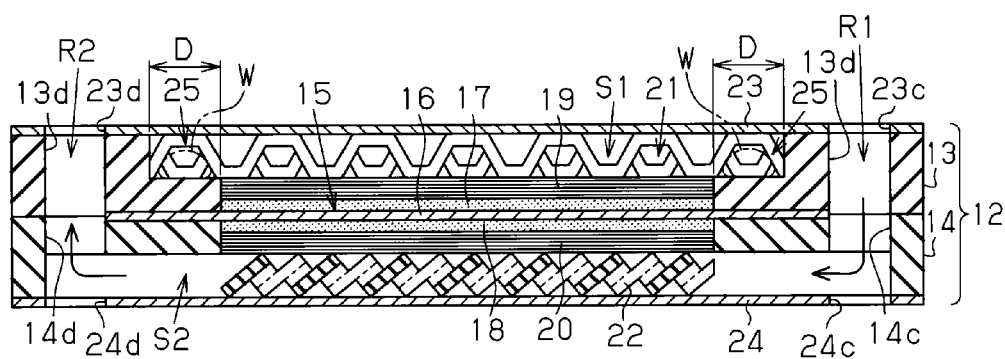
FIG. 2 is a cross-sectional view taken along line 2-2 of FIG. 1.

As shown in FIGS. 1 and 2, the MEA 15 is formed by a solid electrolyte membrane 16, electrode catalyst layers 17 and 18, and conductive first and second gas diffusion layers 19, 20. The electrode catalyst layer 17 is formed of a catalyst that is laid on the anode-side surface of the solid electrolyte membrane 16, that is, on the upper surface as viewed in the drawing. The electrode catalyst layer 18 is formed of a catalyst that is laid on the cathode-side surface of the solid electrolyte membrane 16, that is, on the lower surface as viewed in the drawing. The gas diffusion layers 19, 20 are bonded to the surfaces of the electrode catalyst layers 17, 18, respectively.

Figure 4:
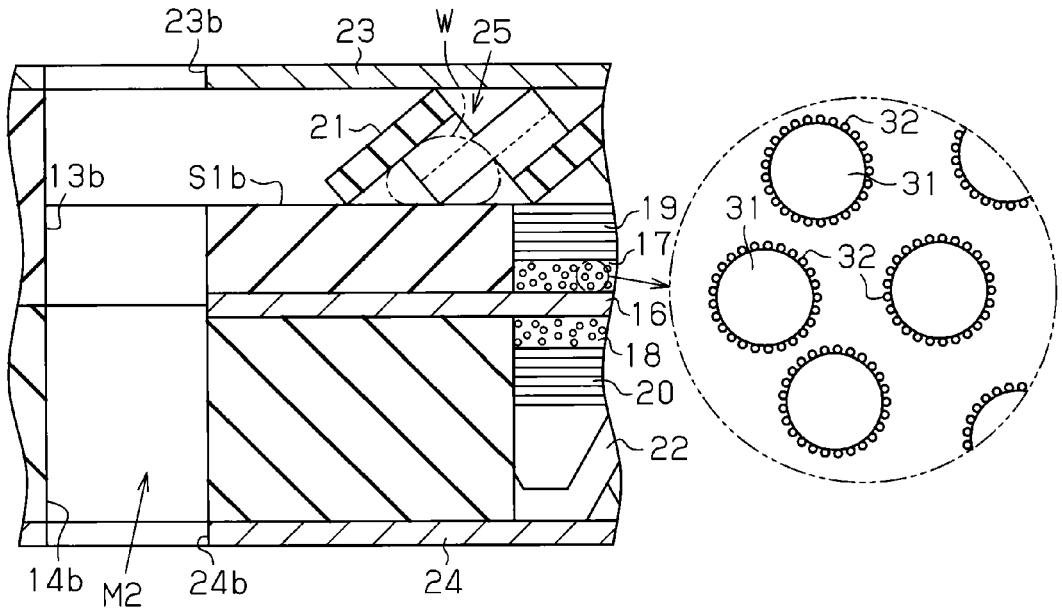
FIG. 4 is an enlarged longitudinal cross-sectional view illustrating a part of the fuel battery.
Figure 5:
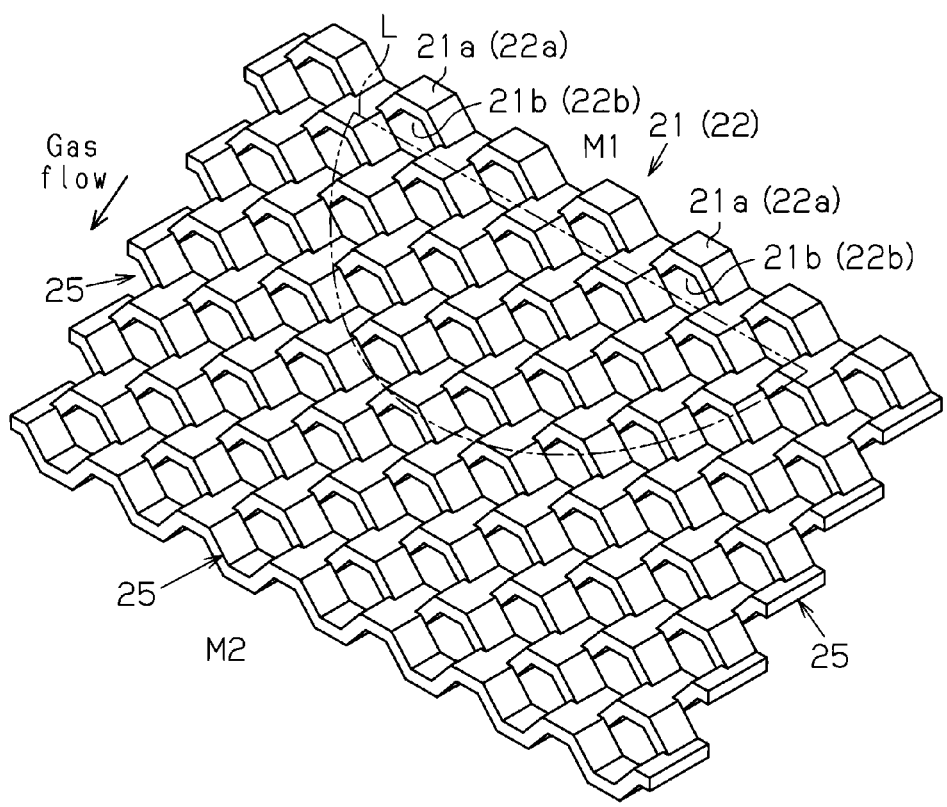
FIG. 5 is a perspective view illustrating a gas passage forming member.

The solid electrolyte membrane 16 is formed of a fluoropolymer film. As shown in FIG. 4, the electrode catalyst layer 17, 18 each have carbon particles 31 of diameters of several micrometers, and a great number of platinum (Pt) catalyst particles 32 adhere to the surface of each carbon particle 31. The catalyst particles 32 have a diameter of 2 nm. When electricity is generated by the fuel battery, the catalyst particles 32 function as catalyst that increases the power generation efficiency. The gas diffusion layers 19, 20 are formed of carbon paper. As shown in FIG. 5, the gas passage forming member 21 (22) is formed of a metal lath plate, which has a great number of hexagonal ring portions 21a (22a) arranged alternately. Each ring portion 21a (22a) has a through hole 21b (22b). Fuel gas (oxidation gas) flows through gas passages formed by the ring portions 21a (22a) and the through holes 21b (22b). FIG. 5 is an enlarged and simplified view showing a part of the gas passage forming member 21, 22.

As shown in FIG. 3, the fuel gas passage space S1 of the first frame 13 is shaped rectangular as viewed from above. A flange portion S1b is formed integrally with the first frame 13 and is located in a lower portion of an inner peripheral surface S1a of the passage space S1. The flange portion S1b horizontally extends inward from the inner peripheral surface S1a and is formed like a rectangular loop. Elongated fuel gas inlet port 13a and fuel gas outlet port 13b are formed in two parallel and facing sides 131, 132 of the flange portion S1b, respectively. Elongated oxidation gas inlet port 13c and oxidation gas outlet port 13d are formed in two sides 133, 134 of the flange portion S1b, which are perpendicular to the sides 131, 132, respectively.

The second frame 14 has a fuel gas inlet port 14a, a fuel gas outlet port 14b, an oxidation gas inlet port 14c, and an oxidation gas outlet port 14d, which correspond to the fuel gas inlet port 13a, the fuel gas outlet port 13b, the oxidation gas inlet port 13c, and the oxidation gas outlet port 13d of the first frame 13, respectively.

A fuel gas inlet port 23a, a fuel gas outlet port 23b, an oxidation gas inlet port 23c, and an oxidation gas outlet port 23d are formed in the four sides of the first separator 23 to correspond to the fuel gas inlet port 13a, the fuel gas outlet port 13b, the oxidation gas inlet port 13c, and the oxidation gas outlet port 13d formed in the first frame 13, respectively. Likewise, a fuel gas inlet port 24a, a fuel gas outlet port 24b, an oxidation gas inlet port 24c, and an oxidation gas outlet port 24d are formed in the four sides of the second separator 24 to correspond to the fuel gas inlet port 14a, the fuel gas outlet port 14b, the oxidation gas inlet port 14c, and the oxidation gas outlet port 14d formed in the second frame 14, respectively.

In the fuel gas passage space S1 and the oxidation gas passage space S2 of the first and second frames 13, 14, the first and second gas passage forming members 21, 22 contacts the surfaces of the gas diffusion layers 19, 20 and the inner surfaces of the first and second separators 23, 24, respectively.

As shown in FIGS. 1 and 3, the fuel gas inlet port 23a of the first separator 23, the fuel gas inlet port 13a of the frame 13, the fuel gas inlet port 14a of the second frame 14, and the fuel gas inlet port 24a of the second separator 24 form a supply passage M1 for supplying fuel gas to each power generating cell 12. The fuel gas outlet port 23b of the first separator 23, the fuel gas outlet port 13b of the first frame 13, the fuel gas outlet port 14b of the second frame 14, the fuel gas outlet port 23b of the separator 23, and the fuel gas outlet port 24b of the second separator 24 form a fuel gas discharge passage M2 through the power generating cells 12. Fuel gas that is supplied to the supply passage M1 from the outside of the fuel battery passes through the gas passage of the first gas passage forming member 21 and is used for generating electricity. Thereafter, the fuel gas is drawn to the discharge passage M2 as fuel off-gas.

The oxidation gas inlet port 23c of the first separator 23, the oxidation gas inlet port 13c of the frame 13, the oxidation gas inlet port 14c of the second frame 14, and the oxidation gas inlet port 24c of the second separator 24 form a supply passage R1 for supplying oxidation gas to each power generating cell 12. The oxidation gas outlet port 23d of the first separator 23, the oxidation gas outlet port 13d of the frame 13, the oxidation gas outlet port 14d of the second frame 14, and the oxidation gas outlet port 24d of the second separator 24 form a discharge passage R2 for discharging oxidation off-gas to each power generating cell 12. Oxidation gas that is supplied to the supply passage R1 from the outside of the fuel battery passes through the gas passage of the second gas passage forming member 22 and is used for generating electricity. Thereafter, the oxidation gas is drawn to the discharge passage R2 as oxidation off-gas.

The configuration of important part of the preferred embodiment will now be described.

As shown in FIGS. 1, 3 and 5, in the outer peripheral portion of the first gas passage forming member 21, projecting portions 25 are formed in edges on the left, right and downstream edges with respect to the flowing direction of the gas passage. The projecting portions 25 extend outward beyond the outer periphery of the anode-side electrode catalyst layer 17 and are overlapped onto flange portion S1b of the frame 13. The projecting portions 25 contact the upper surface of the flange portion S1b. This structure, which includes the projecting portions 25, serves as water ingress preventing means, which prevents seepage water in the gas passage of the projecting portions 25 from entering narrow clearance at the outer peripheral portion of the first gas diffusion layer 19. That is, even if seepage water exists on the projecting portions 25 when the fuel battery generates electricity, the seepage water is received by the upper surface of the flange portion S1b. This prevents the seepage water from entering the narrow clearances at the outer peripheral portion of the first gas diffusion layer 19 and the electrode catalyst layer 17.

In the present embodiment, the thickness of the first gas passage forming member 21 is 0.5 to 1 mm, and the distance D, by which each projecting portion 25 extends outward beyond the outer periphery of the anode-side electrode catalyst layer 17, is 5 to 10 mm. If the distance D is set to an excessively small value (for example, a value less than 5 mm), seepage water on the projecting portions 25 is likely to be moved toward the first gas diffusion layer 19. On the other hand, if the distance D is set to an excessively great value (for example, a value greater than 10 mm), the size of the first gas passage forming member 21 is likely to be excessively large.

The operation of the fuel battery configured as described above will now be described.

As shown in FIGS. 1 and 2, fuel gas and oxidation gas that are supplied to the supply passage M1 and the supply passage R1 are diffused in the fuel gas passage space S1 and the oxidation gas passage space S2 by means of the first and second gas passage forming members 21, 22, respectively. That is, the fuel gas in the fuel gas passage space S1 passes through the gas passage formed in the first gas passage forming member 21 so as to become turbulence, thereby being diffused in the fuel gas passage space S1. The fuel gas is further properly diffused by passing through the first gas diffusion layer 19, so as to be evenly supplied to the electrode catalyst layer 17. On the other hand, the oxidation gas in the oxidation gas passage space S2 passes through the gas passage formed in the second gas passage forming member 22 so as to become turbulence, thereby being diffused in the oxidation gas passage space S2. The oxidation gas is further properly diffused by passing through the second gas diffusion layer 20, so as to be evenly supplied to the electrode catalyst layer 18. The supply of the fuel gas and the oxidation gas initiates an electrode reaction, so that electricity is generated. The fuel battery 11, which is formed by the power generating cells 12, thus outputs a desired electricity.

The above described power generation is similar to that discussed in the BACKGROUND ART. That is, in the anode-side electrode catalyst layer 17, hydrogen (H$_2$) is broken down to hydrogen ions (H$^+$) and electrons (e$^-$) as shown by the chemical formula (1) below, and the potential of the electrode catalyst layer 17 becomes zero volts, or standard electrode potential.

$$H_2 \rightarrow 2H^+ + 2e^- \qquad (1)$$

Hydrogen ions (H$^+$) obtained through the above reaction reaches the cathode-side electrode catalyst layer 18 from the anode-side electrode catalyst layer 17 through the solid electrolyte membrane 16. Oxygen (O$_2$) in the air supplied to the electrode catalyst layer 18 from the second gas passage forming member 22 chemically reacts with the hydrogen ions (H$^+$) and the electrons (e), which generates water as shown by the formula (2). Through the chemical reaction, the potential of the electrode catalyst layer 18 becomes approximately 1.0 bolt, or standard electrode potential.

$$\tfrac{1}{2}.O^2 + 2H^+ + 2e^- \rightarrow H_2O \qquad (2)$$

In the fuel battery, some of the hydrogen gas is not used in power generation and is discharged as fuel off-gas to the outside through the gas passage of the first gas passage forming member 21 and the discharge passage M2. Some of the oxygen gas that has not been reduced during the power generation is discharged as oxidation off-gas to the outside through the discharge passage R2 formed in the frames 13, 14, together with water generated through the reaction of the formula (2) and nitrogen gas in air. Some of the generated water flows into the gas passage of the first gas passage forming member 21, while seeping as seepage water through the cathode-side electrode catalyst layer 18, the solid electrolyte membrane 16, the anode-side electrode catalyst layer 17, and the first gas diffusion layer 19. The seepage water is discharged to the outside through the discharge passage M2, together with the fuel off-gas.

The flow rate of fuel gas flowing through the gas passage in the first gas passage forming member 21 becomes higher toward the center as shown by flow rate distribution curve L of FIG. 5, and becomes lower toward the left and right edges. Thus, as shown in FIGS. 1, 2 and 4, at the three projecting portions 25 located on the left, right, and downstream edges of the first gas passage forming member 21 with respect to the direction of the gas passage, the flow rate of gas is slow and seepage water is likely to remain. Since the seepage water W remaining on the projecting portions 25 is received by the upper surface of the flange portion S1b, which forms the fuel gas passage space S1 in the frame 13, the seepage water is prevented from entering the narrow clearances at the outer peripheral portions of the first gas diffusion layer 19 and the electrode catalyst layer 17. Therefore, the fuel gas (hydrogen gas) is properly supplied to the narrow clearances at the outer peripheral portions of the layers 19, 17, so that deficiency in hydrogen is inhibited. As discussed in the BACKGROUND ART, this prevents the potential of the anode-side electrode catalyst layer 17 from being increased by deficiency in hydrogen, and also inhibits corrosion of the first gas passage forming member 21, thereby inhibiting erosion of the carbon of the cathode-side electrode catalyst layer 18. As a result, the durability of the electrode catalyst layer 18 is improved, and the power generation output is prevented from being reduced.

The above described embodiment has the following advantages.

(1) In the above described embodiment, the projecting portions 25 are formed in the left, right and downstream edges of the first gas passage forming member 21 with respect to the flowing direction of the gas passage. The projecting portions 25 extend outward beyond the outer periphery of the anode-side electrode catalyst layer 17. Seepage water remains on the projecting portions 25. This prevents the seepage water from entering the narrow clearances at the outer peripheral portions of the first gas diffusion layer 19 and the electrode catalyst layer 17. Therefore, the fuel gas (hydrogen gas) is properly supplied to the narrow clearances at the outer peripheral portions of the layers 19, 17, so that deficiency in hydrogen is inhibited. As a result, the potential of the anode-side electrode catalyst layer 17 is prevented from being increased by hydrogen deficiency, and corrosion of the first gas passage forming member 21 due to increase in the potential is prevented. Further, erosion of the carbon of the cathode-side electrode catalyst layer 18 is inhibited, so that the durability of the electrode catalyst layer 18 is improved. This prevents the power generation output from being reduced.

(2) In the above embodiment, since the projecting portions 25 are integrally formed with the first gas passage forming member 21, the structure of the water ingression preventing means is simplified. This facilitates the manufacture and assembly of the structure, and thus reduces the costs.

Second Embodiment

Figure 6:
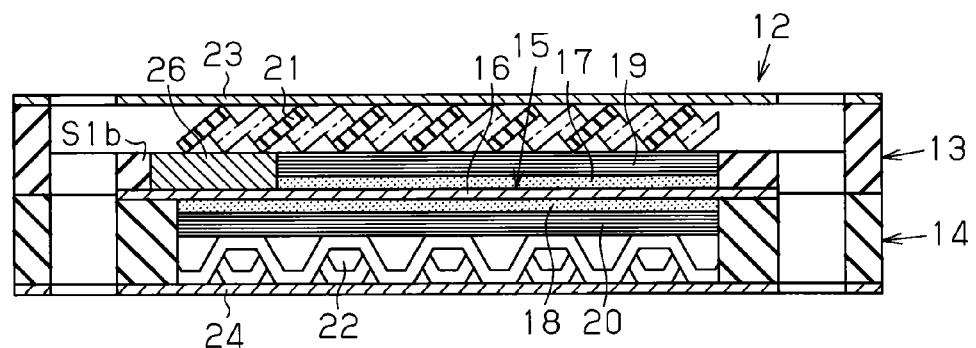
FIG. 6 is a longitudinal cross-sectional view illustrating a fuel battery according to a second embodiment of the present invention.
Figure 7:
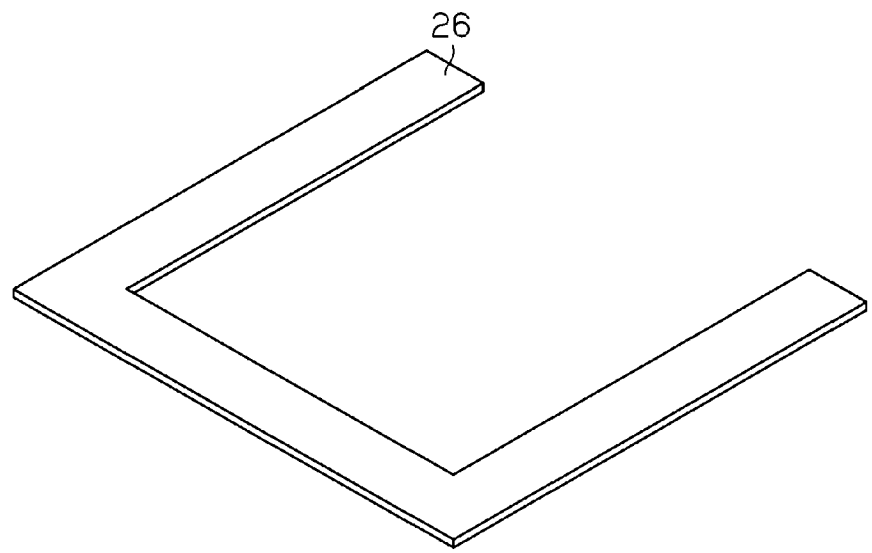
FIG. 7 is a perspective view illustrating a shield plate used in the fuel battery shown in FIG. 6.

A second embodiment of the present invention will now be described with reference to FIGS. 6 and 7.

Water ingression preventing means according to the present embodiment has a configuration in which a shield plate 26 made of an electrical conducting material is bonded to the inner surface of the flange portion S1b with an adhesive. The examples of the material of the shield plate 26 include gold-plated copper. The shield plate 26 is located between the upper surface of the solid electrolyte membrane 16 and the lower surface of the first gas passage forming member 21. As shown in FIG. 7, the shield plate 26 is U-shaped as viewed from above. In relation to the flowing direction of the gas passage, the shield plate 26 is arranged to correspond to the edges on the left, right and downstream edges of the first gas passage forming member 21. The proximal portion of the shield plate 26 may be coupled to the flange portion S1b by insert molding.

In the present embodiment, seepage water remaining at the left, right, and downstream edges of the first gas passage forming member 21 in relation to the flowing direction of the gas passage is received by the shield plate 26, the seepage water is prevented from entering the narrow clearance at the outer peripheral portions of the anode-side electrode catalyst layer 17 and the first gas diffusion layer 19. The present embodiment thus achieves the same advantage as the advantage (1) of the first embodiment.

The above described embodiments may be modified as follows.

Figure 8:
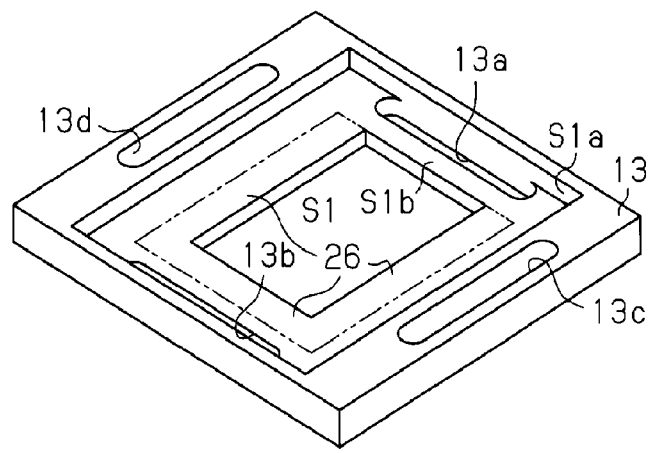
FIG. 8 is a perspective view illustrating a first frame according to another embodiment of the present invention.
Figure 9:
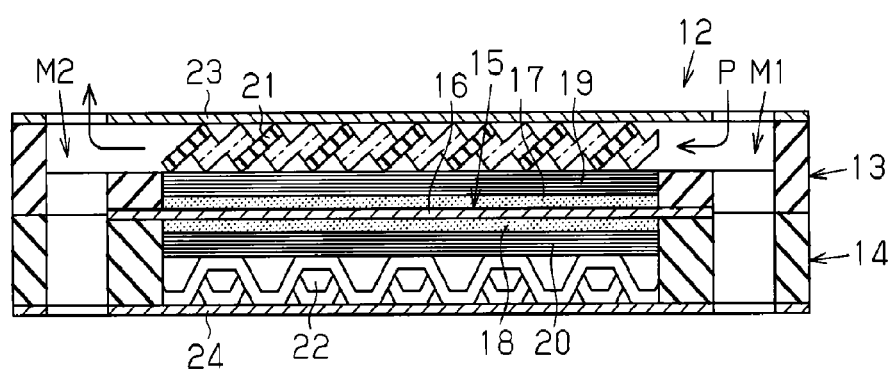
FIG. 9 is a cross-sectional view illustrating a prior art fuel battery.
Figure 10:
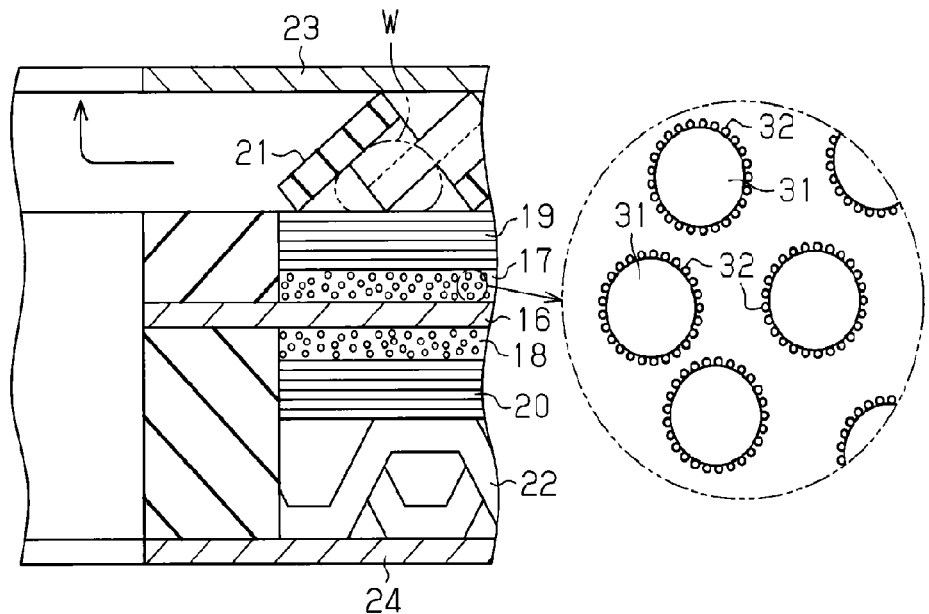
FIG. 10 is an enlarged partial cross-sectional view illustrating the fuel battery shown in FIG. 9.
Figure 11:
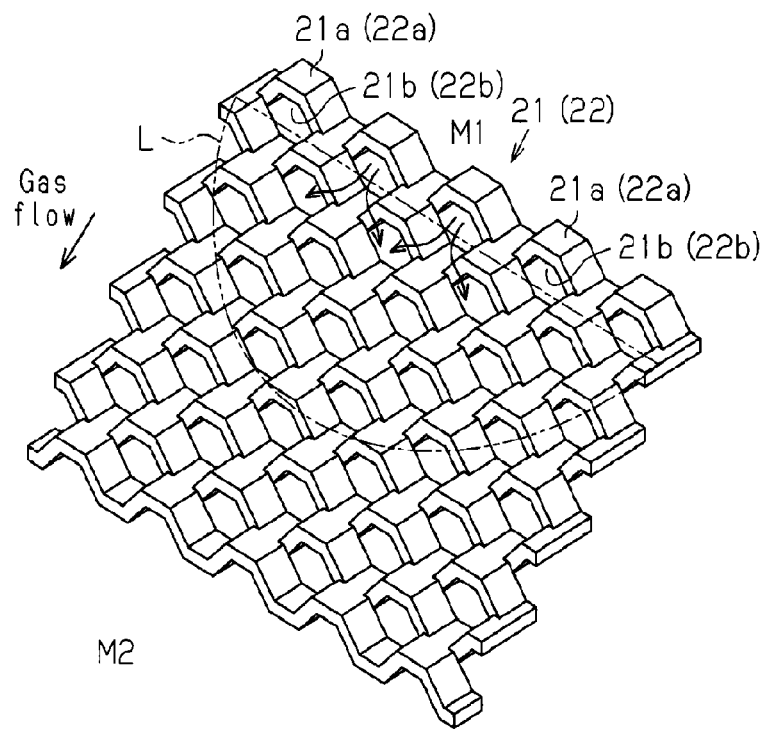
FIG. 11 is a perspective view illustrating a gas passage forming member used in the fuel battery shown in FIG. 9.
Figure 12:
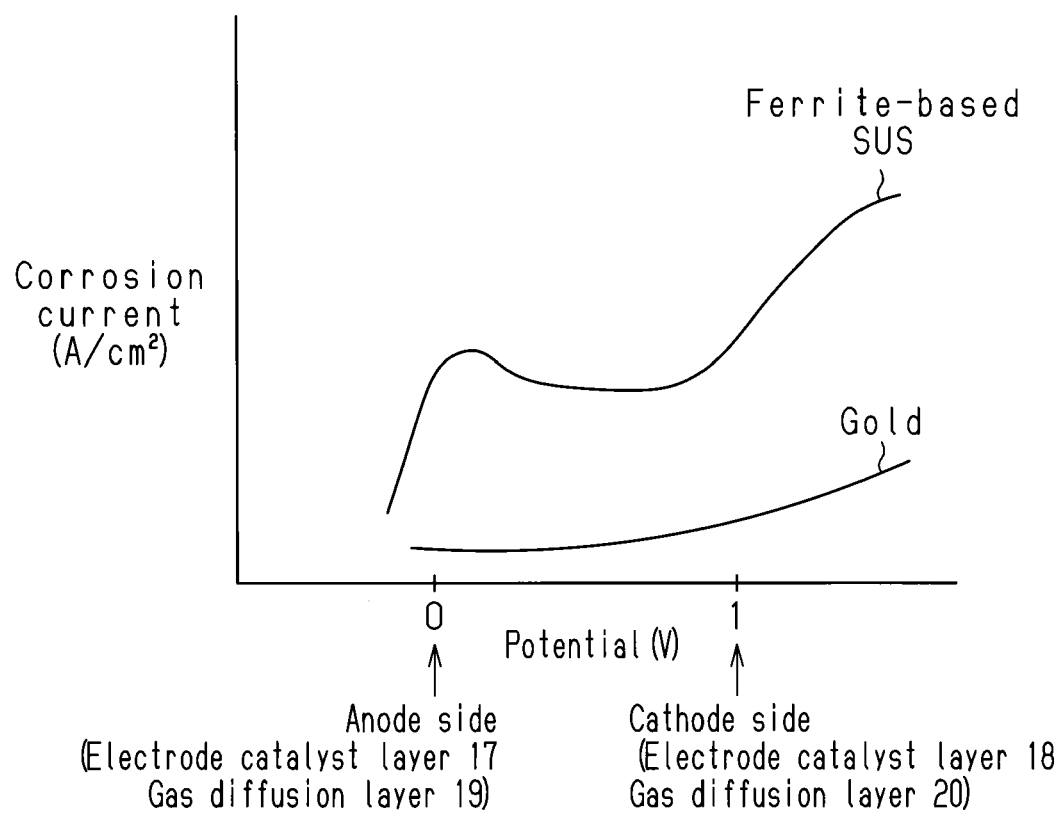
FIG. 12 is a graph showing the relationship between a corrosion current and the potential at the anode side and the cathode side of a fuel battery.

As shown in FIG. 8, the inner periphery of the flange portion S1b of the frame 13 may be extend by a certain length, so as to form a shield plate 26 as in the second embodiment is integrally formed with the frame 13. This simplifies the structure of the water ingression preventing means, thereby facilitating the manufacture of the structure.

Other stainless plates, the first and second gas passage forming members 21, 22 may be formed by metal plates with conductive metal plates such as aluminum and copper.

The present invention may be applied to a fuel battery without the gas diffusion layers 19, 20.

In the first embodiment, the projecting portions 25 are formed at the left, right, and downstream edges with respect to the gas flowing direction in the outer peripheral portion of the first gas flow passage forming member 21. In addition to the three edges, another projecting portion 25 may be formed at the edge located on the upstream side with respect to the flowing direction of the gas passage.

In each of the above embodiments, the distance D by which the projecting portions 25 project beyond the outer periphery of the electrode catalyst layer 17 is set to 5 to 10 mm. However, the distance D may be changed as necessary based on the thickness of the first gas passage forming member 21.

In the above illustrated embodiments, the configurations of the frames 13, 14 have been described. However, frames having different configuration may be employed as long as those frames are located outside of the solid electrolyte membrane 16 and form supply passages and discharge passages for fuel gas and oxidation gas. For example, in the illustrated embodiments, the frame 13 (14) is formed separately from the separator 23 (24). However, the frame 13 (14) and the separator 23 (24) may be formed integrally. Also, frames made of gaskets may be used. Further, frames can be formed by impregnating outer peripheral portions of the gas passage forming members 21, 22 with resin and hardening the resin.

The invention claimed is:

1. A power generating cell for a fuel battery, comprising:
a looped frame;
an electrolyte membrane attached inside the frame;
an anode-side electrode catalyst layer laid on a first surface of the electrolyte membrane;
a cathode-side electrode catalyst layer laid on a second surface of the electrolyte membrane;
a first gas passage forming member made of a metal lath, wherein the first gas passage forming member is laid on the surface of the anode-side electrode catalyst layer and has a first gas passage for supplying fuel gas; and
a second gas passage forming member made of a metal lath, wherein the second gas passage forming member is laid on the surface of the cathode-side electrode catalyst layer and has a second gas passage for supplying oxidation gas,
wherein a supply passage for supplying fuel gas to the first gas passage and a discharge passage for discharging fuel off-gas from the first gas passage are formed in the frame,
wherein water ingression preventing means prevents water remaining in a part of the first gas passage at an outer peripheral portion of the first gas passage forming member from entering the anode-side electrode catalyst layer,
wherein the outer peripheral portion of the first gas passage forming member extends outward beyond the outer periphery of the anode-side electrode catalyst layer and is directly exposed to a discharge passage for discharging fuel gas, and the outer peripheral portion of the second gas passage forming member does not extend outward beyond the outer periphery of the cathode-side electrode catalyst layer,
wherein the water ingression preventing means includes a band-like shield plate that is located at an inner periphery of the frame, between the electrolyte membrane and the outer peripheral portion of the first gas passage forming member, and outside of the anode-side electrode catalyst layer, and
wherein it is possible to discharge, to the discharge passage for fuel gas, the water remaining in the part of the first gas passage at the outer peripheral portion of the first gas passage forming member.

2. A power generating cell for a fuel battery, comprising:
a looped frame;
an electrolyte membrane attached inside the frame;
an anode-side electrode catalyst layer laid on a first surface of the electrolyte membrane;
a cathode-side electrode catalyst layer laid on a second surface of the electrolyte membrane;
a first gas passage forming member made of a metal lath, wherein the first gas passage forming member is laid on the surface of the anode-side electrode catalyst layer and has a first gas passage for supplying fuel gas; and
a second gas passage forming member made of a metal lath, wherein the second gas passage forming member is laid on the surface of the cathode-side electrode catalyst layer and has a second gas passage for supplying oxidation gas,
wherein a supply passage for supplying fuel gas to the first gas passage and a discharge passage for discharging fuel off-gas from the first gas passage are formed in the frame, wherein water ingression preventing means prevents water remaining in a part of the first gas passage at an outer peripheral portion of the first gas passage forming member from entering the anode-side electrode catalyst layer, wherein the frame surrounds the outer periphery of the anode side electrode catalyst layer, wherein the water ingression preventing means includes a projecting portion that is formed on the outer peripheral portion of the first gas passage forming member, extends outward beyond the outer periphery of the anode-side electrode catalyst layer so as to overlap with the frame, and is directly exposed to a discharge passage for discharging fuel gas, the water ingression preventing means preventing water from entering the electrode catalyst layer by causing the water to remain on the projecting portion, wherein the outer peripheral portion of the second gas passage forming member does not have a projecting portion extending outward beyond the outer periphery of the cathode-side electrode catalyst layer, and wherein it is possible to discharge the water remaining on the projecting portion to the discharge passage for fuel gas.

3. The power generating cell for a fuel battery according to claim 2, wherein a distance by which the projecting portion extends beyond the outer periphery of the anode-side electrode catalyst layer is set to 5 to 10 mm.

4. The power generating cell for a fuel battery according to claim 2, wherein the frame is rectangular, wherein the projecting portion is one of a plurality of projecting portions that are formed at left, right and downstream edges in the outer peripheral portion of the first gas passage forming member with respect to a flowing direction of the first gas passage.

5. The power generating cell for a fuel battery according to claim 1, wherein a gas diffusion layer is provided between the anode-side electrode catalyst layer and the first gas passage forming member and between the cathode side electrode catalyst layer and the second gas passage forming member.

* * * * *